(12) United States Patent
Spratt et al.

(10) Patent No.: US 11,086,144 B2
(45) Date of Patent: Aug. 10, 2021

(54) ADJUSTABLE PROGRESSIVE LENS AND DESIGN METHOD

(71) Applicants: Carl Zeiss Vision International GmbH, Aalen (DE); Ray Steven Spratt, Petaluma, CA (US)

(72) Inventors: Ray Steven Spratt, Petaluma, CA (US); Sabine Latzel, Welzheim (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/657,702

(22) Filed: Oct. 18, 2019

(65) Prior Publication Data

US 2020/0050022 A1 Feb. 13, 2020

Related U.S. Application Data

(63) Continuation of application No. PCT/US2018/028008, filed on Apr. 17, 2018, which
(Continued)

(51) Int. Cl.
*G02C 7/08* (2006.01)
*G02C 7/06* (2006.01)
*G02C 7/02* (2006.01)

(52) U.S. Cl.
CPC ............ *G02C 7/081* (2013.01); *G02C 7/027* (2013.01); *G02C 7/06* (2013.01); *G02C 2202/06* (2013.01)

(58) Field of Classification Search
CPC .......... G02C 7/081; G02C 7/027; G02C 7/06; G02C 2202/06; G02C 7/086; G02C 7/08
(Continued)

(56) References Cited

U.S. PATENT DOCUMENTS

| 3,305,294 A | 2/1967 | Alvarez |
| 5,644,374 A | 7/1997 | Mukaiyama et al. |

(Continued)

FOREIGN PATENT DOCUMENTS

| CN | 204595363 U | 8/2015 |
| CN | 106405869 A | 2/2017 |

(Continued)

OTHER PUBLICATIONS

Bourdoncle et al. "Traps in displaying optical performances of a progressive-addition lens", Applied Optics, vol. 31(19), pp. 3586-3593 (Year: 1992).*

(Continued)

*Primary Examiner* — George G King
(74) *Attorney, Agent, or Firm* — Walter Ottesen, P.A.

(57) ABSTRACT

An adjustable spectacle lens has a first lens element and a second lens element arranged one behind the other along an optical axis of the lens. The first and second lens element are configured to vary their combined optical properties when moved relative to each other in a direction transverse to the optical axis. The adjustable lens element is an adjustable progressive lens element. The first and second lens element are configured to vary at least one of a size and a power of the near, the distance, and the intermediate portion relative to each other, when the first lens element and the second lens element are moved relative to each other in the direction transverse to the optical axis. The first and second lens elements can be configured to conjointly provide a near, a distance and an intermediate portion that can be changed depending on the visual task.

18 Claims, 7 Drawing Sheets

Related U.S. Application Data is a continuation-in-part of application No. PCT/US2017/028408, filed on Apr. 19, 2017.

(58) Field of Classification Search
USPC .................................. 351/159.75, 159.48
See application file for complete search history.

(56) References Cited

U.S. PATENT DOCUMENTS

| | | | |
|---|---|---|---|
| 6,655,803 B1 * | 12/2003 | Rubinstein | G02C 7/028 351/159.74 |
| 6,824,268 B2 * | 11/2004 | Rubinstein | G02C 7/028 351/159.52 |
| 7,934,831 B2 | 5/2011 | Spivey et al. | |
| 9,335,446 B2 | 5/2016 | Crosby et al. | |
| 10,073,281 B1 | 9/2018 | Gromotka et al. | |
| 10,185,161 B2 | 1/2019 | Gromotka et al. | |
| 2006/0209431 A1 | 9/2006 | Spivey | |
| 2008/0151184 A1 | 6/2008 | Spivey et al. | |
| 2012/0057124 A1 | 3/2012 | Spivey et al. | |
| 2012/0113393 A1 * | 5/2012 | Spivey | A61B 3/04 351/228 |
| 2015/0370092 A1 | 12/2015 | Nisper et al. | |
| 2017/0192253 A1 * | 7/2017 | Rubinstein | G02C 7/028 |

FOREIGN PATENT DOCUMENTS

| | | | |
|---|---|---|---|
| EP | 0 578 833 A1 | 1/1994 | |
| JP | S63254415 * | 8/1988 | ............. G02C 7/06 |
| KR | 20070048979 A | 5/2007 | |
| WO | 2006/102365 A2 | 9/2006 | |
| WO | 2009/099598 A1 | 8/2009 | |
| WO | 2013/030603 A1 | 3/2013 | |
| WO | WO2013137179 * | 9/2013 | ............. G02C 13/00 |
| WO | 2014/124707 A1 | 8/2014 | |
| WO | 2013/137179 A1 | 8/2015 | |
| WO | 2015/177797 A1 | 11/2015 | |
| WO | 2017/060379 A1 | 4/2017 | |

OTHER PUBLICATIONS

Kneisly, J. A. "Local Curvature of Wavefronts in an Optical System", Journal of the Optical Society of America, vol. 54(2), pp. 229-235 (Year: 1964).*
International preliminary report on patentability and written opinion from the International Bureau of WIPO dated Oct. 22, 2019 in international patent application PCT/US2017/028408 on which a claim of priority is based.
DIN EN ISO 13666: 2012 of the DIN Deutschen Institut fuer Normung, e.V., "Ophthalmic optics—Spectacle lenses," Oct. 2013, pp. 1 to 110.
International search report and written opinion of the international searching authority dated Jan. 3, 2018 in international patent application PCT/US2017/028408 on which the claim of priority is based.
International search report and written opinion of the international searching authority dated Aug. 1, 2018 in international patent application PCT/US2017/028008 on which the claim of priority is based.
International preliminary report on patentability of the international searching authority dated Jun. 7, 2019 in international patent application PCT/US2017/028008 on which the claim of priority is based.
First office action from the Chinese Patent Office dated Apr. 22, 2020 in corresponding Chinese patent application 201880025925.8.

* cited by examiner

ADJUSTABLE PROGRESSIVE LENS AND DESIGN METHOD

CROSS REFERENCE TO RELATED APPLICATIONS

This application is a continuation application of international patent application PCT/US2018/028008, filed Apr. 17, 2018, designating the United States which, in turn, is a continuation-in-part application of international patent application PCT/US2017/028408, filed Apr. 19, 2017, and the entire content of both applications is incorporated herein by reference.

FIELD OF THE INVENTION

The present invention relates to an adjustable spectacle lens. The present invention further relates to a method for designing an adjustable spectacle lens, a corresponding computer program and a method for manufacturing.

BACKGROUND OF THE INVENTION

Presbyopia is a natural part of the aging process of the eye. It is due to hardening of the lens. A person suffering from presbyopia will thus experience accommodation problems, noticeable in particular in near vision. Reading glasses or progressive lenses are frequently used to alleviate such accommodation problems.

Progressive lenses, which are also referred to as progressive addition lenses (PALs), progressive power lenses, graduated prescription lenses, and varifocal or multifocal lenses, are corrective lenses used in eyeglasses to correct presbyopia and other disorders of accommodation. They are characterized by a gradient of increasing lens power, added to the wearer's correction for the other refractive errors. Typically, the gradient starts at the wearer's distance prescription, in the upper portion of the lens and reaches a maximum addition power, or the full reading addition, in the lower portion of the lens. The final addition power is between 0.75 to 3.00 diopters for most wearers. The addition value prescribed generally depends on the level of presbyopia of the patient and is often closely related to age. A drawback of progressive lenses is that they provide a limited field of view and suffer from peripheral vision distortion. The design or configuration of the distance, intermediate and near portions of a progressive lens is a compromise between different visual tasks such as distance vision while driving, intermediate distance computer work and near distance reading.

In contrast to progressive lenses, U.S. Pat. No. 3,305,294 by Nobel laureate Luis Walter Alvarez follows a completely different approach in that a two-element variable power lens is provided wherein the entire lens can be focused for near or distance vision and provide a substantially undistorted view throughout the entire field of vision at each setting. Hence, such a variable power optical lens behaves like a single vision lens providing full field of view and no peripheral vision distortion at each setting.

The company Adlens, Oxford, UK (see www.adlens.com), provides both fluid lenses and Alvarez-style variable power optics that shall provide full field of view with no peripheral vision distortion. Similar to a camera objective, the lenses are re-focused for each required viewing distance, such as distance vision while driving or near distance reading, and shall then provide undistorted view throughout the full field of view at each setting. WO 2014/124707 A1 discloses an Alvarez-style variable-power lens by the company Adlens. Further adjustable focus lenses are disclosed in US 2006/0209431 A1, US 2008/0151184 A1, EP 0 578 833 A1, U.S. Pat. No. 5,644,374 and WO 2006/102365 A2.

US 2012/057124 A1 discloses a low inventory method of making eyeglasses. Two lens elements having special complementary surfaces are provided. These lens elements can be positioned relative to each other to provide wide ranges of focus correction and astigmatism correction. In one embodiment the required inventory is only identical sets of two complementary lenses for providing correction for almost all needed eye correction for a typical population. In this embodiment, the lens units are first adjusted relative to each other to provide a desired focusing power. Astigmatism may be corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

PCT/EP2016/073920 discloses a spectacle lens consisting of a carrier lens and a lens segment being displaceable with respect to the carrier lens dependent on the gaze of the wearer.

SUMMARY OF THE INVENTION

It is an object of the present invention to provide an improved spectacle lens that overcomes one or more of the disadvantages of the prior art. It would be particularly advantageous to provide an improved spectacle lens that can provide improved vision in a larger variety of application scenarios, in particular involving near and distance vision.

To better address one or more of these concerns, according to a first aspect of the invention, an adjustable spectacle lens is provided. The adjustable spectacle lens comprises:

a first lens element and a second lens element arranged one behind the other along an optical axis of the lens; wherein the first lens element and the second lens element are configured to vary their combined optical properties when moved relative to each other in a direction transverse to the optical axis;

wherein adjustable spectacle lens is an adjustable progressive spectacle lens. The first lens element and the second lens element can be configured to work together to provide a near portion, a distance portion and an optional intermediate portion. The first lens element and the second lens element can be configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in the direction transverse to the optical axis. Hence, a size and/or an add power can be varied.

To better address one or more of these concerns, according to a first aspect of the invention, an adjustable spectacle lens is provided. The adjustable spectacle lens comprises:

a first lens element and a second lens element arranged one behind the other along an optical axis of the lens; wherein the first lens element and the second lens element are configured to vary their combined optical properties when moved relative to each other in a direction transverse to the optical axis;

wherein the adjustable spectacle lens is an adjustable progressive spectacle lens. The first lens element and the second lens element can be configured to work together to provide a near portion, a distance portion and an optional intermediate portion. The first lens element and the second lens element can be configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in the direction transverse to the optical axis. Hence, a size and/or an add power can be varied.

According to a further aspect of the invention, an adjustable spectacle lens is provided, the adjustable spectacle lens comprising:

a first lens element and a second lens element arranged one behind the other along an optical axis of the lens; wherein the first lens element and the second lens element are configured to vary their combined optical properties when moved relative to each other in a direction transverse to the optical axis;

wherein the adjustable spectacle lens is an adjustable progressive spectacle lens. The first lens element and the second lens element can be configured to work together to provide a near portion, a distance portion and an optional intermediate portion.

The first lens element and the second lens element can be configured to vary at least one of an add power of the near portion, a size of the near portion, a size of the distance portion, and a size of the intermediate portion, when the first lens element and the second lens element are moved relative to each other in the direction transverse to the optical axis. Hence, a size and/or an add power can be varied.

The present invention is based on the idea to provide a progressive lens, wherein the configuration of near, distance and intermediate portions can be changed depending on the visual task.

The inventors have recognized that a wearer using conventional progressive spectacle lenses is constrained to have a single distribution of power which may not be ideal for certain visual tasks. For example, while driving a large distance region would be desirable, while a rather limited near portion would be sufficient to check the instruments. On the other hand, in an office setting a larger near or intermediate portion would be desirable, while a more limited distance portion may be sufficient. Furthermore, in view of different reading distances required for reading a book or for reading on a screen, an increased flexibility of optical power and/or the size of the corresponding portions of a progressive lens would be desirable.

Neither a conventional progressive lens nor a conventional Alvarez lens as disclosed in U.S. Pat. No. 3,305,294 provides an acceptable solution. Even though the Alvarez lens can provide a large undistorted field of view, a drawback is that the lens would have to be frequently re-adjusted or re-focused whenever changing the visual task. Playing solitaire on your smartphone while watching TV would be such a task. As another example, the lens would have to be re-focused each time when switching between a distant presentation and the notes in front of you.

The inventors discovered that a variety of variable optical distributions can be achieved by using an extension of the Alvarez lens concept. Since the first lens element and the second lens element are configured to work together to provide a near portion, a distance portion and optionally an intermediate portion between the near portion and the distance portion, this overcomes the need to frequently readjust the lens, for example when switching between a distant presentation and your notes. However, since the first lens element and the second lens element are configured to vary their combined optical properties when moved relative to each other in the direction transverse to the optical axis, the wearer is not constrained to have a single distribution of power in the near portion, the distance portion and the intermediate portion.

It thereby becomes possible to vary the combined optical properties to a specific task. For example, a progressive lens whose add power varies with a vertical translation between the two lens elements can be achieved. Thereby, the add power can be adjusted to a desirable reading distance as for example a book or a screen. As a further example, the size of the near and/or distance portions can be varied. For example, a large distance portion may be desirable while driving, whereas a large near portion is desirable when reading. The adjustable progressive lens thus provides an adjustable distribution of near, distance and/or intermediate portions. The sizes and/or powers (or power distributions) of the portions can advantageously be varied relative to each other.

According to a second aspect there is provided a method, in particular a computer-implemented method, for designing an adjustable progressive spectacle lens, the adjustable spectacle lens comprising a first lens element and a second lens element arranged one behind the other along an optical axis of the lens; wherein the first lens element and the second lens element are configured to work together to provide a near portion, a distance portion and an intermediate portion. The first lens element and the second lens element can be configured to vary their combined optical properties when moved relative to each other in a direction transverse to the optical axis. In particular, the first lens element and the second lens element can be configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in the direction transverse to the optical axis. The method comprises the steps of:

obtaining data descriptive of a first predetermined configuration of at least one of near, distance and intermediate portions;

obtaining data descriptive of a second predetermined configuration of at least one of near, distance and intermediate portions;

determining the first and the second lens elements such that the first lens element and the second lens element work together to provide,
   in a first position relative to each other, the near, distance and intermediate portions according to the first predetermined configuration; and to provide,
   in a second position relative to each other, the near, distance and intermediate portions according to the second predetermined configuration.

According to a further aspect there is provided a method, in particular a computer-implemented method, for designing an adjustable progressive spectacle lens, the adjustable spectacle lens comprising a first lens element and a second lens element arranged one behind the other along an optical axis of the lens; wherein the first lens element and the second lens element are configured to work together to provide a near portion, a distance portion and an intermediate portion. The first lens element and the second lens element can be configured to vary their combined optical properties when moved relative to each other in a direction transverse to the optical axis. In particular, the first lens element and the second lens element can be configured to vary at least one of an add power of the near portion, a size of the near portion, a size of the distance portion, and a size of the intermediate portion, when the first lens element and the second lens element are moved relative to each other in the direction transverse to the optical axis. The method comprises the steps of:

obtaining data descriptive of a first predetermined configuration of at least one of near, distance and intermediate portions;

obtaining data descriptive of a second predetermined configuration of at least one of near, distance and intermediate portions;

determining the first and the second lens elements such that the first lens element and the second lens element work together to provide, in a first position relative to each other, the near, distance and intermediate portions according to the first predetermined configuration; and to provide, in a second position relative to each other, the near, distance and intermediate portions according to the second predetermined configuration.

According to a third aspect a method for manufacturing an adjustable progressive spectacle lens is provided, the adjustable progressive spectacle lens comprising a first lens element and a second lens element arranged one behind the other along an optical axis of the lens; wherein the first lens element and the second lens element are configured to work together to provide a near portion, a distance portion and an intermediate portion. The first lens element and the second lens element can be configured to vary their combined optical properties when moved relative to each other in a direction transverse to the optical axis. In particular, the first lens element and the second lens element can be configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in the direction transverse to the optical axis. The method comprises the steps of:

obtaining data descriptive of a first predetermined configuration of at least one of near, distance and intermediate portions;

obtaining data descriptive of a second predetermined configuration of at least one of near, distance and intermediate portions;

determining the first and the second lens elements such that the first lens element and the second lens element work together to provide, in a first position relative to each other, the near, distance and intermediate portions according to the first predetermined configuration; and to provide, in a second position relative to each other, the near, distance and intermediate portions according to the second predetermined configuration; and manufacturing the adjustable progressive spectacle lens according to the determination.

According to a further aspect a method for manufacturing an adjustable progressive spectacle lens is provided, the adjustable progressive spectacle lens comprising a first lens element and a second lens element arranged one behind the other along an optical axis of the lens; wherein the first lens element and the second lens element are configured to work together to provide a near portion, a distance portion and an intermediate portion. The first lens element and the second lens element can be configured to vary their combined optical properties when moved relative to each other in a direction transverse to the optical axis. In particular, the first lens element and the second lens element can be configured to vary at least one of an add power of the near portion, a size of the near portion, a size of the distance portion, and a size of the intermediate portion, when the first lens element and the second lens element are moved relative to each other in the direction transverse to the optical axis. The method comprises the steps of:

obtaining data descriptive of a first predetermined configuration of at least one of near, distance and intermediate portions;

obtaining data descriptive of a second predetermined configuration of at least one of near, distance and intermediate portions;

determining the first and the second lens elements such that the first lens element and the second lens element work together to provide, in a first position relative to each other, the near, distance and intermediate portions according to the first predetermined configuration; and to provide, in a second position relative to each other, the near, distance and intermediate portions according to the second predetermined configuration; and manufacturing the adjustable progressive spectacle lens according to the determination.

The method for manufacturing an adjustable progressive spectacle lens can comprise the method, in particular computer-implemented method, for designing the adjustable progressive spectacle lens according to the second aspect followed by manufacturing the adjustable progressive spectacle lens according to the design or determination. The step of manufacturing the adjustable progressive spectacle lens can comprise the sub-steps of manufacturing the first lens element and the second lens element. The step of manufacturing can further comprise providing a movement device configured to move at least one of the lens elements relative to the other in a direction transverse to the optical axis of the lens; and mounting the first and second lens elements to the movement device.

According to a fourth aspect a computer program is provided comprising program code means for causing a computer to carry out the steps of the method according to the second aspect when the computer program is carried out on a computer or processing unit.

According to a further aspect, there is provided a machine readable, in particular non-transitory, storage medium having stored thereon a computer program comprising program code means for carrying out the steps of the method according to the second aspect.

Preferred embodiments of the invention are defined in the dependent claims. It shall be understood that the claimed design method, manufacturing method, computer program and storage medium can have similar and/or identical embodiments or preferred embodiments as the claimed adjustable progressive spectacle lens, in particular as defined in the dependent claims and as disclosed herein.

In the following, some terms which are used throughout the application shall be shortly explained and defined. Unless otherwise indicated, the terminology used in the context of the present application corresponds to the definitions in the standard DIN EN ISO 13666: 2013-10 of the DIN (Deutsches Institut für Normung e.V.).

The term front surface or front of a lens or lens element shall refer to that surface of the lens intended to be fitted away from the eye, cf. No. 5.8 of the standard DIN EN ISO 13666. The term back surface or back of the lens shall refer to that surface of the lens intended to be fitted nearer to the eye, cf. No. 5.9 of the standard DIN EN ISO 13666.

The term distance portion shall refer to that portion of a progressive lens having the dioptric power for distance vision, cf. No. 14.1.1 of the standard DIN EN ISO 13666. The term intermediate portion shall refer to that portion of the progressive lens having a dioptric power for vision at ranges intermediate between distance and near, cf. No. 14.1.2 of the standard DIN EN ISO 13666. The term near portion or reading portion shall refer to that portion of the progressive lens having a dioptric power for near vision, cf. No. 14.1.3 of the standard DIN EN ISO 13666.

The term progressive lens shall refer to a lens with at least one progressive surface, preferably providing an increasing (positive) addition power as the wearer looks down, cf. No. 8.3.5 of the standard DIN EN ISO 13666. As used herein, a progressive lens may also refer to a lens with at least one progressive surface that provides decreasing power as the wearer looks up or down.

The term optical axis generally refers to a straight line, perpendicular to both optical surfaces of a spectacle lens, along which light can pass undeviated, cf. No. 4.8 of the standard DIN EN ISO 13666. It should be noted that for aspheric or freeform surfaces, as may be used in the present disclosure, there may not be a true optical axis within the meaning of No. 4.8 of the standard. As used herein, the term optical axis shall therefore refer to the direction of view in an as-worn position or the line of sight or visual axis the wearer looks through the spectacle lens to a distant object in an as-worn orientation. In other words, reference can be made to the main fixation direction as the most common direction of the line of sight relative to the primary position, cf. No. 5.33 of the standard. The primary position shall refer to the position of the eye relative to the head, looking straight ahead at an object at eye level, cf. No. 5.31 of the standard DIN EN ISO 13666.

As used herein, a direction transverse to the optical axis can refer to a direction having an oblique angle with respect to the direction of the optical axis but not necessarily perpendicular. An angle between the optical axis and the direction transverse to the optical axis can preferably be in a range between 70° and 90°, further preferably between 80° and 90°.

The first lens element and the second lens element can be configured to work together to provide a near portion, a distance portion and an intermediate portion.

As used herein, varying or changing the combined optical properties of the first lens element and the second lens element can refer to changing a configuration of one or more of the near portion, the distance portion, and the intermediate portion, in particular in terms of size and/or optical power. By changing the relative position of the first lens element and the second lens element, these combined optical properties can be varied accordingly. For example, the first lens element and the second lens element can slide or move with respect to each other in a side-to-side motion. A side-to-side motion can also comprise a relative up-down motion of the first and second lens elements relative to each other. The first lens element and the second lens element may vary their combined optical properties when shifted across one another.

The first lens element and the second lens element can be configured to provide, in a first position relative to each other, a first predetermined configuration of the size and/or optical power of near, distance and intermediate portions; and to provide, in a second position relative to each other, a second predetermined configuration of the size and/or optical power of near, distance and intermediate portions. An advantage of this embodiment is that at least two different predetermined configurations of near, distance and intermediate portions of the progressive spectacle lens can be provided. The first and second predetermined configurations can differ from each other in particular in terms of size and/or optical power of the near, distance and/or intermediate portions, respectively. In other words, the user is not constrained to have a single distribution of power which may not be ideal for a particular visual task. The wearer thus has the freedom to choose between the different predetermined configurations. These can also be referred to as first and second target optical properties or first and second power profiles of the progressive spectacle lens. In an embodiment, an optical power of the distance portion and/or the near portion may remain fixed, for example in case of zone size variation instead of power variation or power variation of only parts of the lens.

In an embodiment, the first lens element and the second lens element are movable between the first position and the second position relative to each other in a vertical direction in an as-worn orientation. Hence, a vertical displacement can be provided to switch between the first and the second configurations of near, distance and intermediate portions. An advantage of this embodiment is that horizontal distortions can be reduced. A vertical direction as used herein can include a variation of ±30° to account for a tilted corridor between distance and near portion, since eyes are converging for near vision.

Advantageously, the first lens element and the second lens element can be configured to vary an add power of the near portion when moved relative to each other in the direction transverse to the optical axis. An advantage of this embodiment is that the user may thus set the additional optical power provided by the near portion depending on a visual task, for example setting a higher add power when looking at the display of a smartphone at short distance and a slightly lower add power when reading a book. It has been found that people tend to hold their smartphones (or e-readers) nearer to the eyes than they do with books or magazines for reading. In an embodiment, an optical power of the distance portion may remain fixed. Optionally, the first and the second lens element can be further configured to also vary the add power of the distance and/or intermediate portion. This enables, for example, a conversion of an all-purpose PAL, in a first position of the first and second lens elements relative to each other, into a specialized office lens, in a second position of the first and second lens elements relative to each other.

Alternatively or in addition, the first lens element and the second lens element can be configured to vary at least one of a group comprising a size of the near portion, a size of the distance portion, and a size of the intermediate portion, when moved relative to each other in the direction transverse to the optical axis. For example, a size of the near portion may be increased for reading tasks, a larger intermediate portion would be favorable for office tasks such as computer work, whereas a larger size of the distance portion may be advantageous while driving or during other leisure activities. The sizes of other portions can be adjusted (reduced) accordingly.

The first lens element and the second lens element can be configured to vary their combined optical properties based on a translation relative to each other. In other words, the first lens element and the second lens element can be moved with respect to each other in a side-to-side motion. For example, the first and second lens element can slide over each other in a sideways motion. A sideways motion can include the special cases of a vertical or horizontal motion. An advantage of this embodiment is that the lens elements perform a relative motion of reduced complexity. Alternatively, the first lens element and the second lens element can be moved relative to each other by rotating the lens elements relative to each other. The rotation can be in a plane transverse, in particular perpendicular to the optical axis.

In an embodiment a back surface of the first lens element faces a front surface of the second lens element; wherein the back surface of the first lens element can correspond to the front surface of the second lens element. The back surface of the first lens element and the front surface of the second lens element can be shaped such that they are movable with respect to each other. The first lens element can refer to a front lens element intended to be fitted away from the eye and the second lens element can refer to a back lens element, i.e., the one nearer to the eye of the wearer. Preferably, the back of the first lens element and the front of the second lens element are shapes that can be moved with respect to each other in at least one direction without increasing their separation. Preferably, a small separation between the first lens element and the second lens element can thereby be provided. Advantages of this embodiment can involve thinner, more aesthetic and/or more practical lenses. As a further advantage, this may enable a one-dimensional movement or substantially one-dimensional movement relative to each other such that means for moving the first lens element relative to the second lens element having a reduced complexity can be provided. Advantageously, the shapes of the back surface of the first lens element and the front surface of the second lens element also provide guidance along a direction of the movement. In other words, the back surface of the first lens element and the front surface of the second lens element can be configured to work together as a guiding structure.

In an embodiment of this embodiment the back surface of the first lens element and the front surface of the second lens element can be corresponding spherical surfaces. An advantage of this embodiment is easy manufacturing of the respective front and back surfaces. The respective front surface of the first lens element and the back surface of the second lens element can be configured as freeform surfaces. Hence, the desired combined optical properties can be achieved by the design of the front surface of the first lens element and the back surface of the second lens element.

In a further embodiment, a first fixed position and a second fixed position for the first lens element relative to the second lens element can be provided. In other words, the adjustable spectacle lens can be configured such that the first lens element and the second lens element can be moved relative to each other between the first fixed position and the second fixed position. Two or more fixed positions may be provided rather than continuous control. The use of predetermined fixed positions can simplify the lens design since only two positions with predetermined optical properties have to be provided instead of a continuous range. This also provides the possibility to reduce aberrations since less boundary conditions have to be met when optimizing for a limited number of positions rather than a continuous range.

In a further embodiment of this embodiment, the first position can be a main position and the second position can be an auxiliary position; and the first lens element and the second lens element can be configured to work together to provide lower aberrations in the main position than in the auxiliary position. The first lens element and the second lens element can thus be configured to work together to provide lower aberrations in the first position than in the second position. It will be appreciated that lens design always involves trade-offs. An advantage of this embodiment is that the lens design of the adjustable progressive spectacle lens can be optimized for the most likely use case or scenario where highest performance is required.

The first lens element and the second lens element are configured to be moved relative to each other by a distance out of a group of distances: between 0.1 mm and 6 mm, between 0.2 mm and 4 mm, between 0.5 mm and 3 mm, and between 1 mm and 2 mm, in a direction transverse to the optical axis. Different combinations of upper and lower thresholds can be set. The boundaries form part of the range. For example, the first and the second lens element may have to be moved relative to each other by a distance of 3 mm to switch between a first position and a second position in order to change the combined optical properties of the first lens element and the second element from a first predetermined configuration to a second predetermined configuration of near, distance and intermediate portions. Moving the first lens element and the second lens element relative to each other by a large amount can negatively impact aesthetics and may require complex mechanics for moving the lens elements relative to each other. On the other hand, too short a shift may require the surface power to change by a very large amount, i.e., may introduce steep gradients, that may require thicker lenses or may be challenging to manufacture in view of the edge steepness.

The adjustable progressive spectacle lens can further comprise means for moving at least one of the lens elements relative to the other in a direction transverse to the optical axis of the lens. In other words, a movement device or unit configured to move at least one of the lens elements relative to the other in a direction transverse to the optical axis may be provided. In an embodiment a spectacle frame may be configured accordingly, i.e., the movement device can be part of the spectacle lens itself or part of the spectacle frame or a separate dedicated element. For example, a gear, knurl, slider, the like, manually or automatically operated may be provided.

The first lens element and the second lens element can be rigid lens elements having a predetermined shape. Advantages of rigid lens elements, for example over fluid lens elements, can be increased robustness and easier manufacturing, for example by means of injection molding or freeform generation.

In an embodiment at least one of the group comprising a front surface of the first lens element, a back surface of the first lens element, a front surface of the second lens element, and a back surface of the second lens element can be a spherical surface. An advantage of this embodiment is that lens elements can at least in part be manufactured using a standard base curve, optionally including pre-formed lens blanks. A further advantage can be a more aesthetic design and optionally better protection of the eye due to the curved form.

It is to be understood that the features mentioned above and those yet to be explained below may be used not only in the combination respectively indicated, but also in other combinations or separately, without departing from the scope of the present invention.

BRIEF DESCRIPTION OF THE DRAWINGS

These and other aspects of the invention will be apparent from and elucidated with reference to the embodiments described hereinafter. In the following drawings

DESCRIPTION OF PREFERRED EMBODIMENTS

Figure 1:
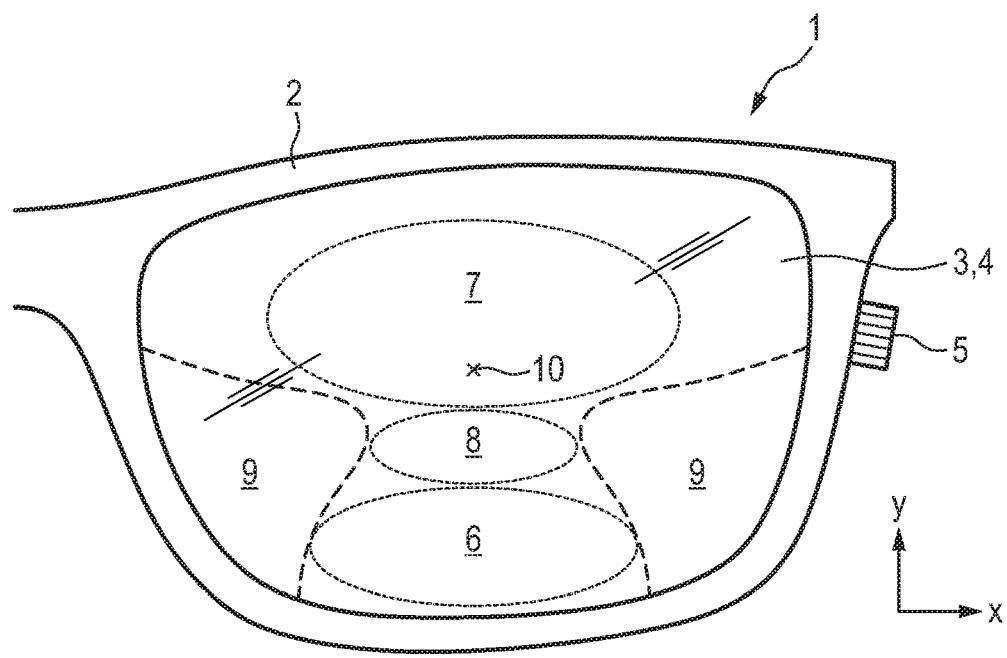
FIG. 1 shows a schematic diagram of an embodiment of an adjustable progressive spectacle lens according to an aspect of the present disclosure.

FIG. 1 shows a front view of an adjustable progressive spectacle lens 1 mounted to a spectacle frame 2 according to an exemplary embodiment.

The adjustable progressive spectacle lens 1 comprises a first lens element 3 and a second lens element 4 arranged one behind the other along an optical axis of the lens. In the embodiment shown in FIG. 1, the first lens element 3 and the second lens element 4 are thus arranged one behind the other in plane substantially parallel to the plane of the drawing. The adjustable progressive spectacle lens 1 can further comprise means 5 for moving at least one of the lens elements 3, 4 relative to the other in a direction transverse to the optical axis of the lens. For example, the means 5 may be implemented as a dial engaging with a corresponding structure of the second lens element 4 and configured to move the second lens element 4 in a vertical or y-direction in a direction transverse to the optical axis, here the z-axis.

The first lens element 3 and the second lens element 4 are configured to work together to provide at least a near portion 6 and a distance portion 7. An intermediate portion 8 can be provided between the near portion 6 and the distance portion 7. The combined optical properties of the first lens element and the second lens element working together can be designed to correspond, in a first position relative to each other, to a configuration of near, distance and intermediate portions as known from progressive spectacle lenses. The adjustable progressive spectacle lens 1 may further comprise (blurred) blending regions 9 due to the power gradient between the near portion 6 and the distance portion 7, in the peripheral regions of the lens. However, it is to be understood that these regions do not form part of a primary vision corridor from the distance portion 7 via the intermediate portion 8 to the near portion 6. The optical axis 10 of the lens as used herein can refer to the line of sight of the person looking at an object at eye level at a distance in an as-worn orientation. The optical axis 10 is thus substantially perpendicular to the first lens element and the second lens element. Substantially perpendicular as used herein can include a variation of ±30° to account for an optional tilt of the lens in a spectacle frame.

The variation of the combined optical properties of the adjustable progressive spectacle lens 1 when one of the first lens element and the second lens element is moved relative to the other in a direction transverse to the optical axis 10 will be explained in more detail with reference to the following figures.

Figure 2:
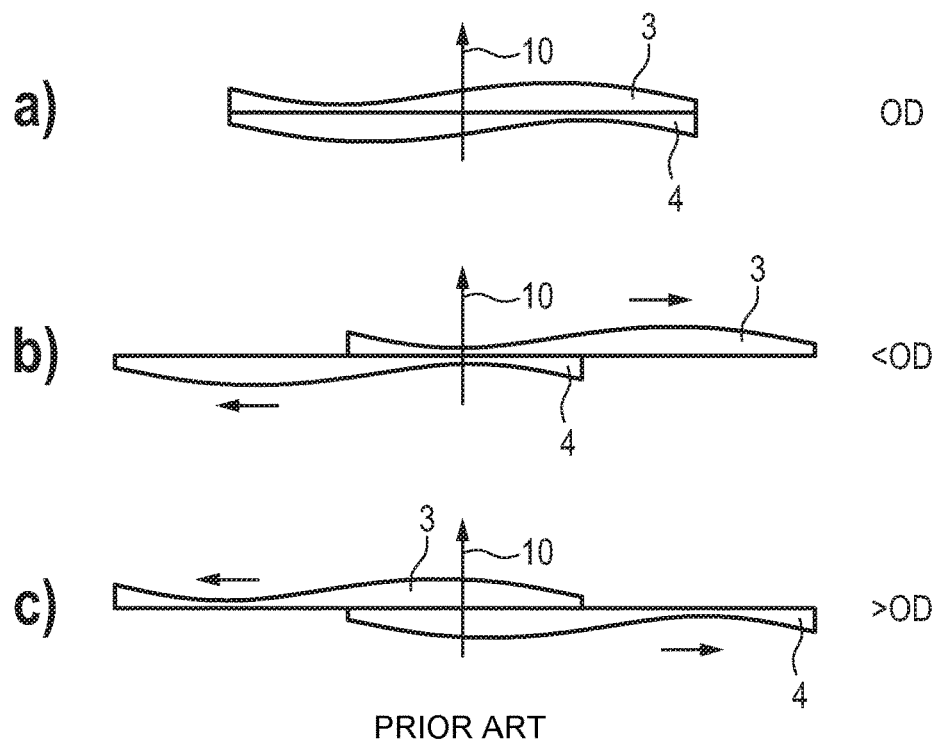
FIG. 2 shows a schematic diagram illustrating the Alvarez principle.

FIG. 2 illustrates the general working principle of an Alvarez-style lens comprising a first lens element 3 and a second lens element 4. In scenario (a), the first lens element 3 and the second lens element 4 are centered with respect to each other. In combination they provide a lens element of uniform thickness even though being curved. The first lens element 3 and the second lens element 4 provide a combined optical power of approximately 0 diopters. In scenario (b), the first lens element 3 is moved to the right and the second lens element 4 is moved to the left thereby aligning two concave surfaces along the optical axis 10. The combined optical power of the first lens element and the second lens element thereby provides a negative optical power of <0 diopters. In scenario (c), the first lens element 3 is moved to the left whereas the second lens element 4 is moved to the right, thereby providing two convex surfaces along the optical axis 10. The resulting optical power is a positive optical power of >0 diopters. This illustrates the general principle that a side-to-side movement of a first lens element 3 and a second lens element 4 in a direction transverse to the optical axis 10 can be used to vary the combined optical properties when moved relative to each other.

Figure 3:
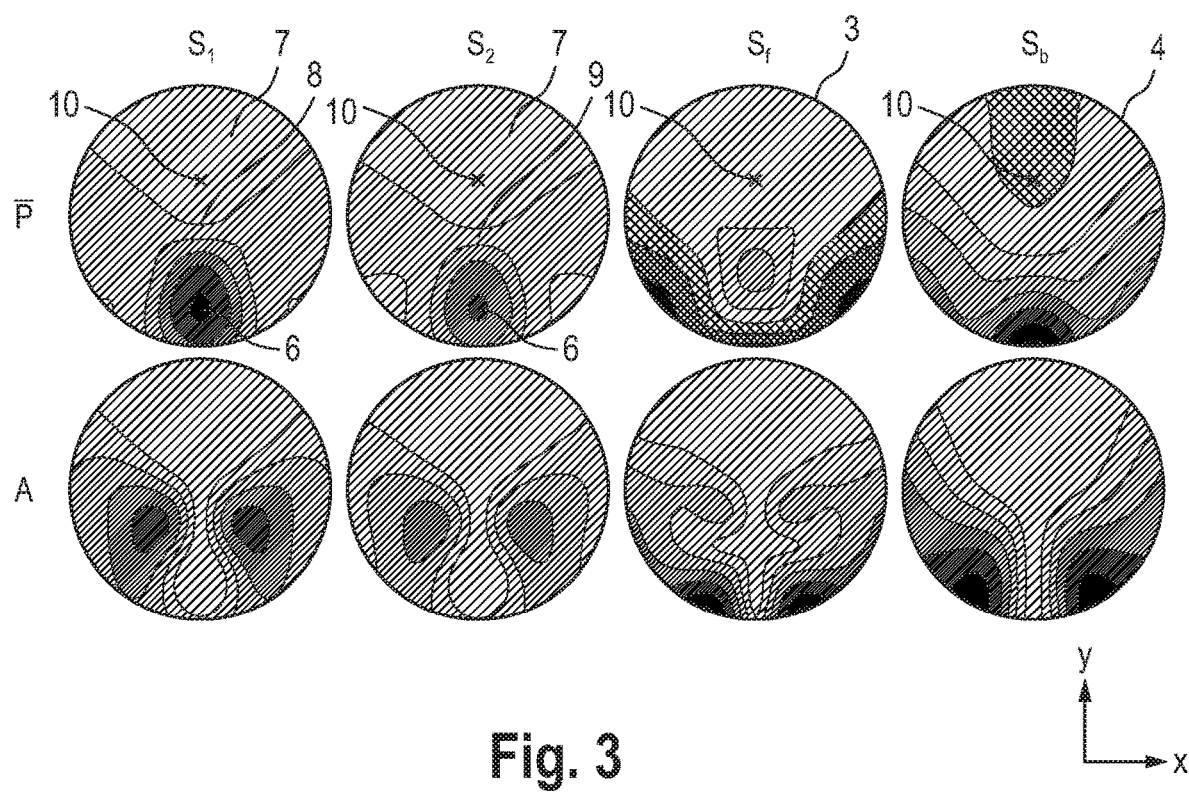
FIG. 3 shows schematic diagrams of the mean surface power and surface astigmatism distributions of two target surfaces and two surfaces corresponding to a first lens element and a second lens element according to an aspect of the present disclosure.

FIG. 3 shows an embodiment of a first predetermined configuration of near, distance and intermediate portions represented by a first target surface $S_1$ and a second predetermined configuration of near, distance and intermediate portions represented by a second target surface $S_2$. The upper row of diagrams in FIG. 3 show the mean surface power, i.e., the average surface power provided along the principal meridians of each point on the surface. Surface power refers to a geometric property, derived from curvatures and refractive index. The lower row of diagrams in FIG. 3 illustrates the astigmatism, i.e., the difference between the surface powers provided between the principal meridians in each point of the surface. This mean surface power is referred to as P herein and the astigmatism is referred to as A. The diagrams show so-called contour plots wherein the lines denote contour lines corresponding to values of equal magnitude. In the shown example, the lines are provided in 0.5 diopter contour steps. In the following corresponding figures, the upper rows show the respective mean powers and the lower rows denote the respective astigmatism.

The first target surface $S_1$ corresponds to a progressive spectacle lens providing a 2.50 D (diopter) surface add power progressive surface, i.e. increase in surface power from the distance portion to the near portion. The second target surface $S_2$ corresponds to a progressive spectacle lens providing a 2.00 D surface add power progressive surface.

The four diagrams in the third and fourth columns of FIG. 3 describe a first surface $S_f$ descriptive of the first lens element 3 and a second surface $S_b$ descriptive of the second lens element 4. In the proposed adjustable progressive spectacle lens 1, the first lens element 3 with the first surface $S_f$ and the second lens element 4 with the surface $S_b$ are arranged one behind the other along the optical axis 10 of the lens. Thereby, the first lens element and the second lens element and correspondingly the first surface $S_f$ and the second surface $S_b$ work together to provide combined optical properties. More specifically, the first element 3 and the second lens element 4 are configured to provide, in a first position relative to each other, the first predetermined configuration of near, distance and intermediate portions as shown by $S_1$; and to provide, in a second position relative to each other, a second predetermined configuration of near, distance and intermediate portions as illustrated by $S_2$. The shown example illustrates the general concept for the limit of lenses of infinitely small thickness based on surface power addition only. Nonetheless, the same underlying concept can be applied to actual lenses. For example, $S_f$ and $S_b$ can be the front surfaces of two lens elements arranged one behind the other, each having the same spherical back surface. In the shown non-limiting example, the combined optical property of the surfaces $S_f$ and $S_b$, when the first lens element and the second lens element are aligned, sum up to $S_1$. When the first lens element and the second lens element are intentionally misaligned, here by a distance $\Delta y$, they sum up to $S_2$. In other words, considering the surface heights for example $$S_1(x, y) = S_f(x, y) + S_b(x, y)$$

$$S_2(x, y) = S_f(x, y) + S_b(x, y + \Delta y)$$

Then $$S_b(x, y + \Delta y) - S_b(x, y) = S_2(x, y) - S_1(x, y)$$

$$\Delta y \frac{dS_b}{dy} \approx S_2(x, y) - S_1(x, y)$$

or $$S_b(x, y) \approx \frac{1}{\Delta y} \int dy (S_2(x, y) - S_1(x, y)) + g(x).$$

Then, based on $S_b$ it follows $S_f(x,y)=S_1(x,y)-S_b(x,y)$. The element g(x) can be an arbitrary function of x only, which can be tailored to minimize the aberrations of the individual surfaces $S_f$ and $S_b$. In the given simplified example, the target surfaces $S_1$ and $S_2$ are assumed to be flat base curve 2.50 D, and 2.00 D add surfaces with no inset. It is assumed that $\Delta y=4$ mm. It will be appreciated that the above concept is not limited to the specific example and that other target surfaces or configurations of near, distance and intermediate zones and/or different displacement may be selected as required by a given application or visual task.

Figure 4:
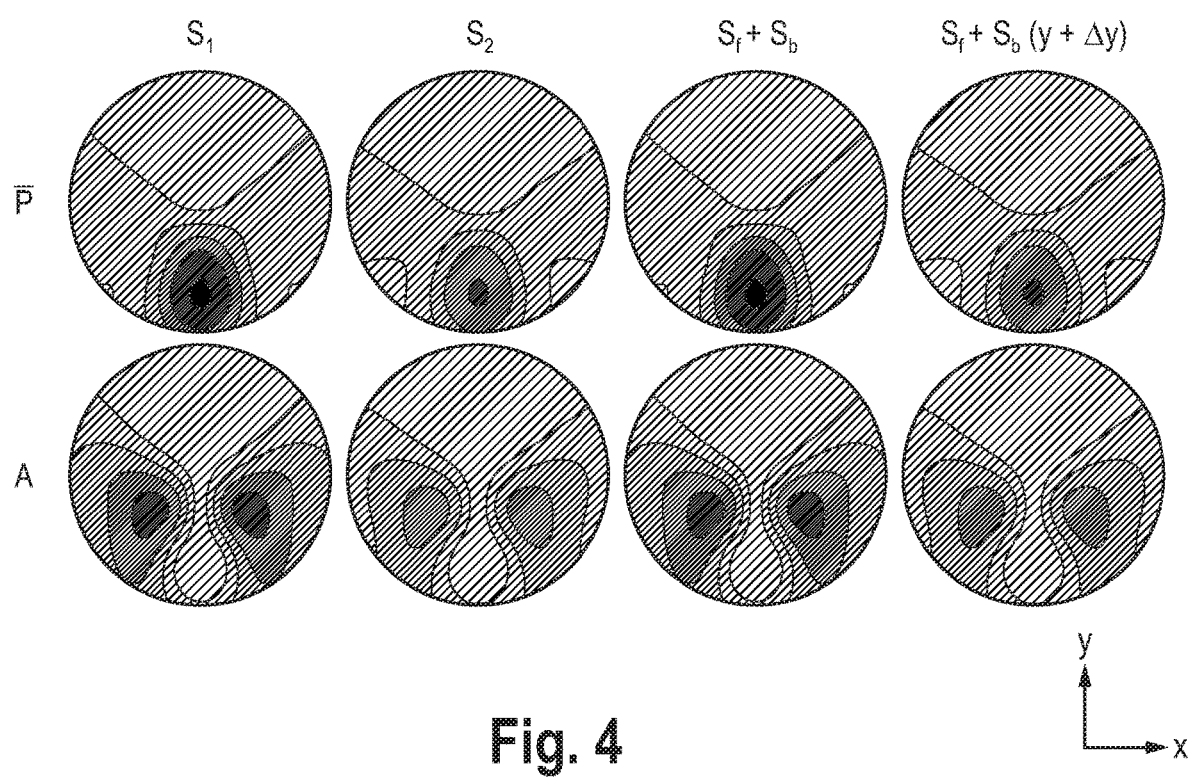
FIG. 4 shows schematic diagrams of mean surface power and surface astigmatism distributions of two target surfaces and the combined optical properties of the surfaces of FIG. 3 corresponding to the first lens element and the second lens element in a first and second position relative to each other.

FIG. 4, third column shows the combined optical properties, here the surface powers of the combined surfaces, of the first lens element 3 and the second lens element 4 in the first position relative to each other wherein the surfaces $S_f$ and $S_b$ are aligned. This is referred to as $S_f+S_b$. FIG. 4, fourth column shows the combined optical properties, here the surface powers of the combined surfaces, of the first lens element 3 and the second lens element 4 in a second position relative to each other, wherein the surfaces $S_f$ and $S_b$ (see FIG. 3) are intentionally misaligned by a distance $\Delta y$ in a direction transverse to the optical axis. This is referred to as $S_f+S_b$ (y +$\Delta y$). The four graphs on the left hand side correspond to the four graphs on the left hand side of FIG. 3. The third column denoted by $S_f+S_b$ thus corresponds to a superposition of the surfaces $S_f+S_b$ as shown in the third and fourth column in FIG. 3. As can be seen, the graphs in the third column of FIG. 4 show good correspondence with the graphs corresponding to the first target surface denoted by $S_1$. The graphs in the fourth column denoted by $S_f+S_b$ (y+$\Delta y$) show good correspondence with the graphs corresponding to the second target surface denoted by $S_2$ in the second column. Optionally, further optimization can be performed by iterative computation algorithms.

Figure 5:
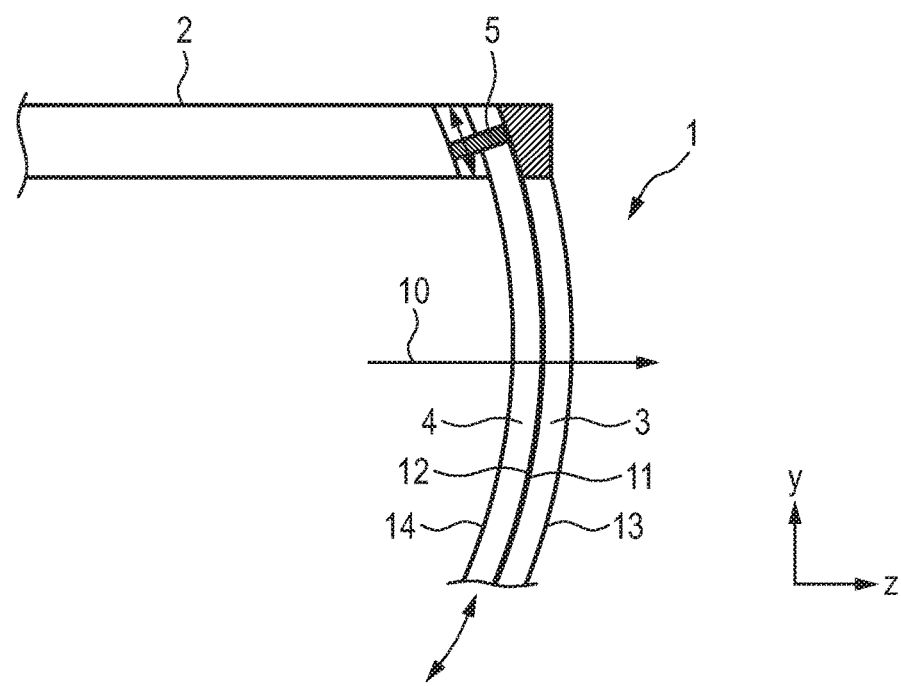
FIG. 5 shows a schematic cross-sectional view of a further embodiment of an adjustable progressive spectacle lens according to an aspect of the present disclosure.

FIG. 5 shows a schematic cross-sectional view of a further embodiment of an adjustable progressive spectacle lens 1 mounted to a spectacle frame 2. The adjustable progressive spectacle lens 1 comprises a first lens element 3 and a second lens element 4 arranged one behind the other along the optical axis 10 of the lens. The means 5 for moving at least one of the lens elements relative to the other, here for moving the second lens element 4, are implemented by means of a slider.

In the embodiment shown in FIG. 5, a back surface 11 of the first lens element 4 faces a front surface 12 of the second lens element 4, wherein the back surface 11 of the first lens element 3 corresponds to the front surface 12 of the second lens element 4. Furthermore, a back surface 11 of the first lens element 3 and the front surface 12 of the second lens element 4 are shaped such that they can be moved with respect to each other in a direction transverse to the optical axis 10. Generally, there can be various shapes to fulfill this property such as planar surfaces. However, as shown in FIG. 5, the back surface 11 of the first lens element 3 and the front surface 12 of the second lens element 4 are preferably corresponding spherical surfaces. Thereby, a more aesthetic design can be achieved and furthermore a curved lens may provide better protection of the eye of the wearer. A further advantage of this embodiment is that standardized shapes and manufacturing can be used. In the following non-limiting example, a 4 base design wherein the back surface 11 of the first lens element 3 is a spherical surface having a concave radius of curvature of 4 diopters. Correspondingly, the front surface 12 of the second lens element 4 is a corresponding spherical surface having a convex curvature of 4 diopters.

Figure 6:
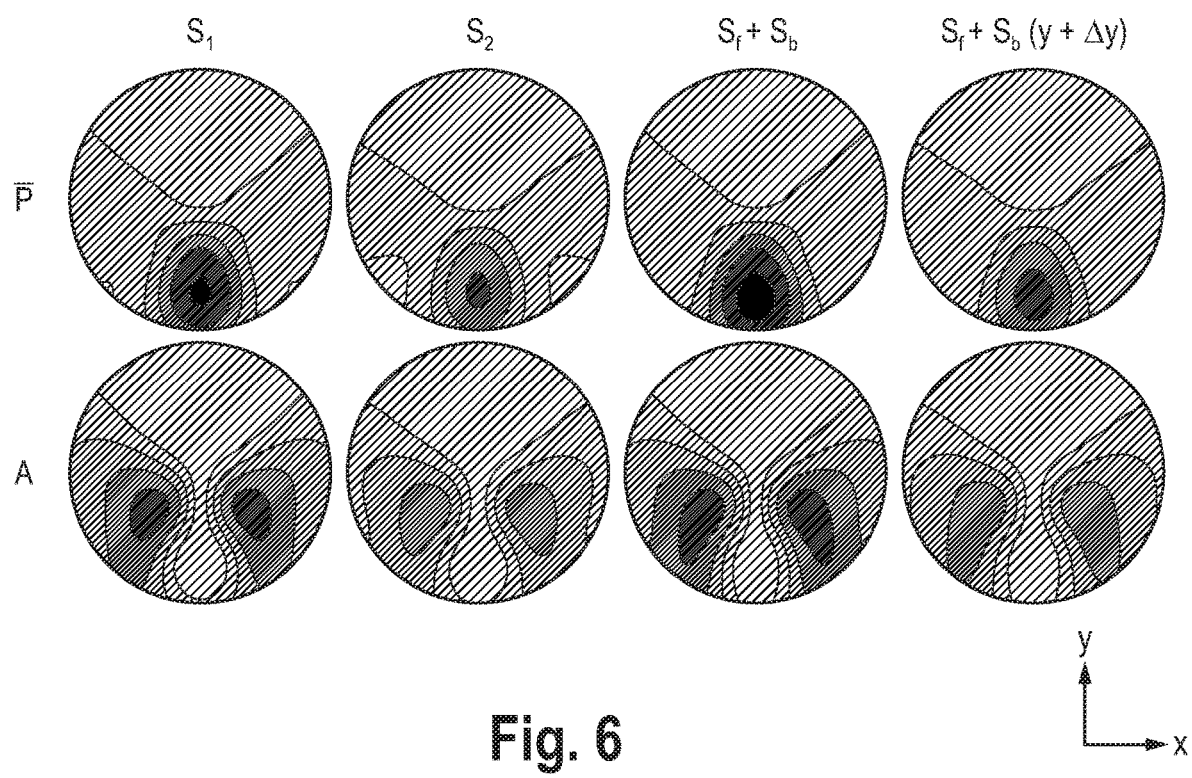
FIG. 6 shows schematic diagrams of mean back vertex power and astigmatic back vertex power of an embodiment of a first and a second predetermined configuration of near, distant and intermediate portions and the combined optical properties of a first lens element and a second lens element in a first and a second position relative to each other.

The first lens element 3 and the second lens element 4 are configured to provide, in a first position relative to each other, the first predetermined configuration of near, distance and intermediate portions as shown in the first column of FIG. 6 indicated by $S_1$, and to provide, in a second position relative to each other, a second predetermined configuration of near, distance and intermediate portions as in the second column of FIG. 6 indicated by $S_2$. While the previous example illustrated the underlying concept in terms of surface powers, FIG. 6 shows schematic diagrams of mean back vertex power and astigmatic back vertex power as would be measured with a measuring device like a vertometer. The first lens element 3 has a spherical −4D curvature back surface 11 and $S_f$ as the front surface 13. The second lens element 4 has a spherical +4D curvature front surface 12 and a back surface 14 given by $S_b$. The powers of the front surface 13 of the first lens element 3 and the back surface 14 of the second lens element 4 are determined as described above with reference to FIGS. 3 and 4 and further taking into account the curvature of the respective first and second lens elements 3, 4. It should further be noted that compared to the afore-mentioned example, the sign of the back surface contribution relative to the front surface contribution has to be flipped since the power on the back surface 14 of the second lens element 4 subtracts rather than adds. Furthermore, a sphere has been added for obtaining the correct back vertex power.

As can be seen from FIG. 6, third and fourth column, the combined optical properties of the first lens element and the second lens element 4 shown in column 3 matches with the first predetermined configuration of near, distance and intermediate portions indicated by the target back vertex power distribution $S_1$ in the first column of FIG. 6. Correspondingly, when the first lens element 3 and the second lens element 4 are intentionally moved with respect to each other by distance Δy in a vertical direction y in an as-worn orientation, the combined optical properties of the first lens element 3 and the second lens element 4 indicated by $S_f+S_b(y+\Delta y)$ shown in column 4 of FIG. 6 correctly matches the second predetermined configuration of near, distance, and intermediate portions indicated by target back vertex power distribution $S_2$ shown in the second column of FIG. 6.

Figure 7:
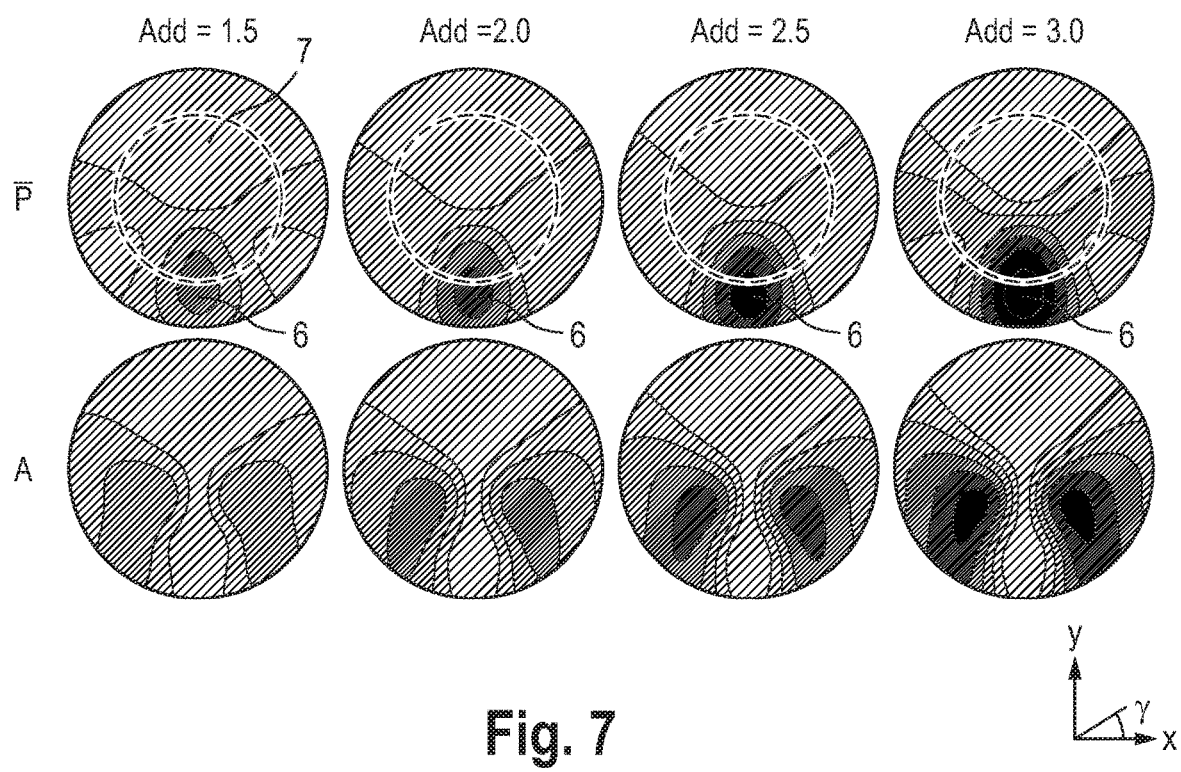
FIG. 7 shows schematic diagrams of the effects on mean back vertex power and astigmatic back vertex power of various different positions of the first lens element and the second lens element relative to each other.

FIG. 7 illustrates the effects of further moving the first lens element 3 relative to the second lens element 4 beyond the first position, as shown in column 3 of FIG. 6, wherein the first lens element 3 and the second lens element are aligned, or beyond the second position relative to each other, as shown in column 4 of FIG. 6, wherein the first lens element 3 and the second lens element 4 are intentionally misaligned by a distance Δy. The graphs in the second column of FIG. 7 correspond to the graphs in the fourth column of FIG. 6. An add power of +2.0 D is provided in the near portion 6. The graphs shown in column 3 of FIG. 7 correspond to the graphs shown in column 3 of FIG. 6. Therein, an add power of +2.5 D is provided. When the first lens element 3 and the second lens element 4 are intentionally misaligned by +Δy'>Δy the add power can be further reduced to obtain an add power of 1.5 D, as shown in column 1 of FIG. 7. Correspondingly, when moving the first lens element 3 and the second lens element 4 relative to each other by −Δy" in the opposite direction, an increased add power of +3.0 D can be achieved as shown in column 4 of FIG. 7.

Figure 8:
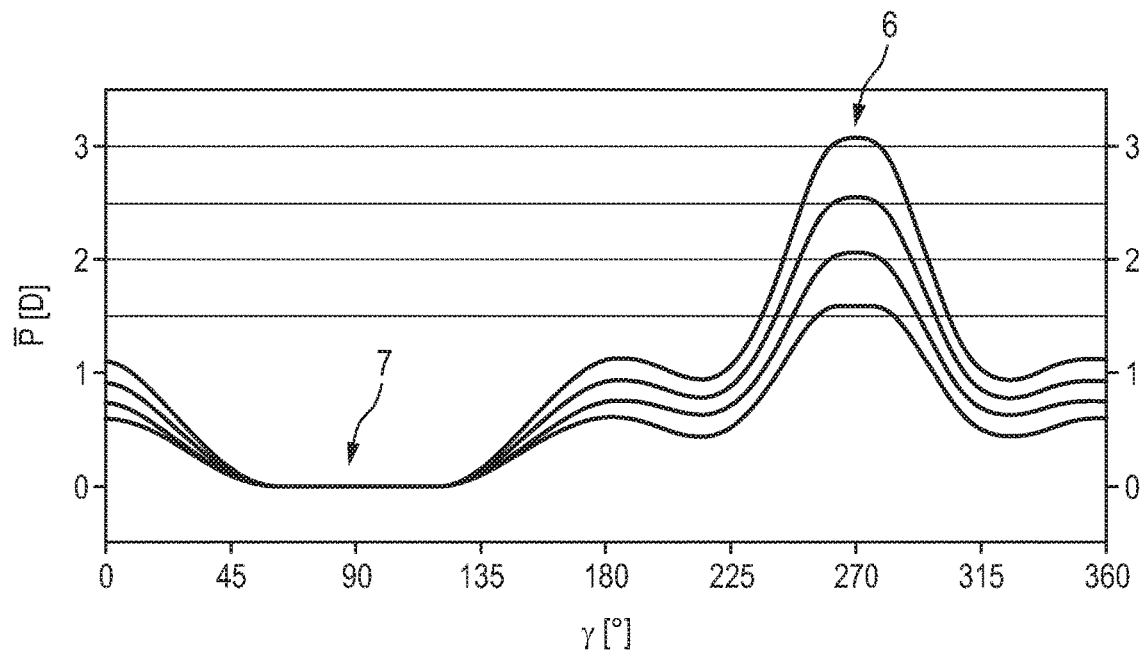
FIG. 8 shows a diagram of the mean power provided in the diagrams of FIG. 7 along a circle.

It should be noted that the different appearances of the boundary regions of the mean power plots in the first row of FIG. 7 can be attributed to artifacts of the contouring interval. This is illustrated with reference to FIG. 8 which shows a diagram of the mean powers for the four relative positions of the first lens element 3 and the second lens element 4 of FIG. 7. FIG. 8 shows the mean powers along a circle of 20 mm radius versus angle, as indicated by the circles in the first row of FIG. 7. As can be seen from the graphs in FIG. 8, the traces for the different configurations show similar shape. The horizontal axis in FIG. 8 denotes the angle γ in degrees [°] with respect to the horizontal x-axis in FIG. 7. Therein, the distance portion corresponds to an angle of 90° and the near portion, for the different add powers ranging from 1.5 to 3.0 diopters, can be seen at an angle of 270°.

Figure 9:
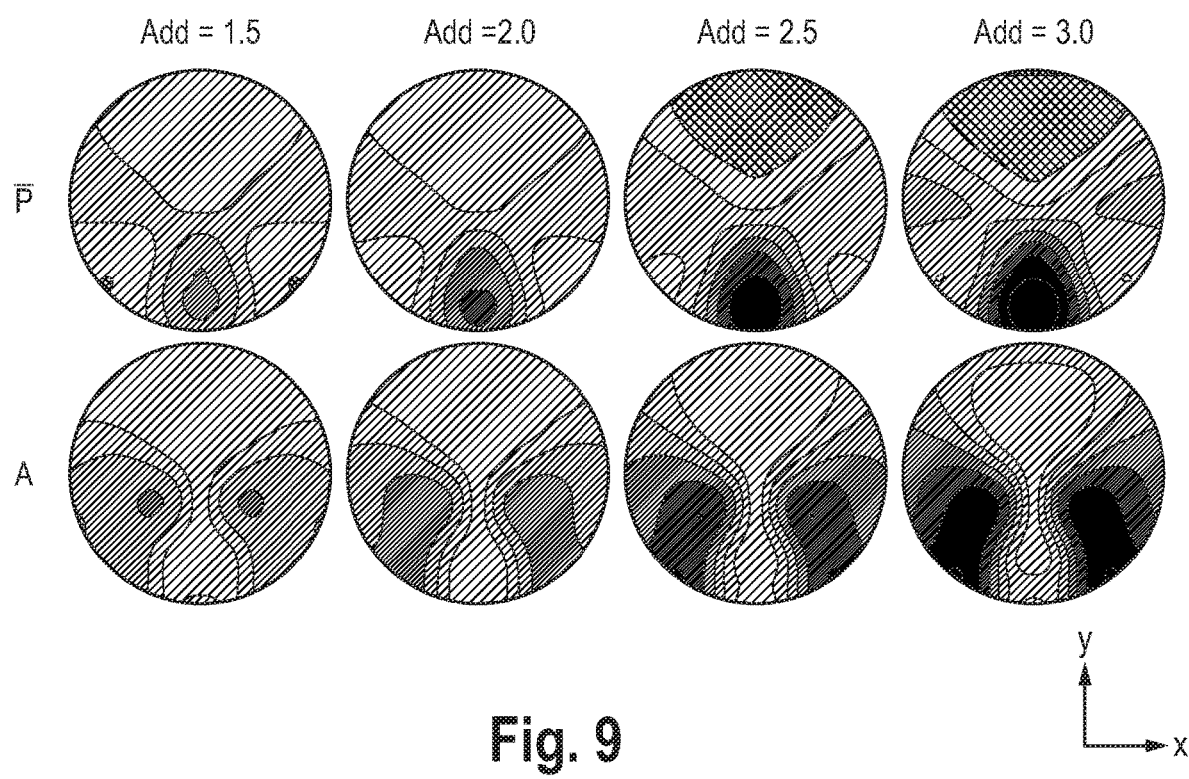
FIG. 9 shows diagrams of mean power and astigmatism as perceived by the wearer.

FIG. 9 shows more detailed graphs corresponding to the graphs of FIG. 7. FIG. 9 shows the result of a ray-tracing for the wearer in position of wear instead of ray-tracing for a focimeter. The upper row in FIG. 9 illustrates diagrams of the ray-traced mean power whereas the lower row indicates graphs of astigmatism for the same range of add powers. An aspherization of the targets was introduced to accommodate the ray-tracing simulation. It will be appreciated that the ray-trace designs may serve as a basis for further optimization, for example in an iterative optimization procedure.

In an embodiment, the adjustable progressive spectacle lens can be configured to provide a first fixed position and a second fixed position for the first lens element relative to the second lens element. Therein, the first position can be a main position and the second position can be an auxiliary position and a first lens element and a second lens element can be configured to work together to provide lower aberrations in the main position than in the auxiliary position. For example, the main position may provide a first predetermined configuration of near, distance and intermediate portions that is optimized for desk work as the main application scenario of the user. Since most of the time is spent in this configuration, the combined optical properties of the first lens element and the second lens element are optimized to provide the lowest aberrations in this configuration. A secondary, auxiliary position of the first and second lens element may provide a second predetermined configuration of near, distance and intermediate portions which is less frequently used or for only a limited time during the day. For example, a secondary configuration having a larger distance zone may be provided for following presentations in a meeting. In view of the limited amount of time in this configuration, a higher level of aberrations may be tolerable without introducing considerable eye strain.

Figure 10:
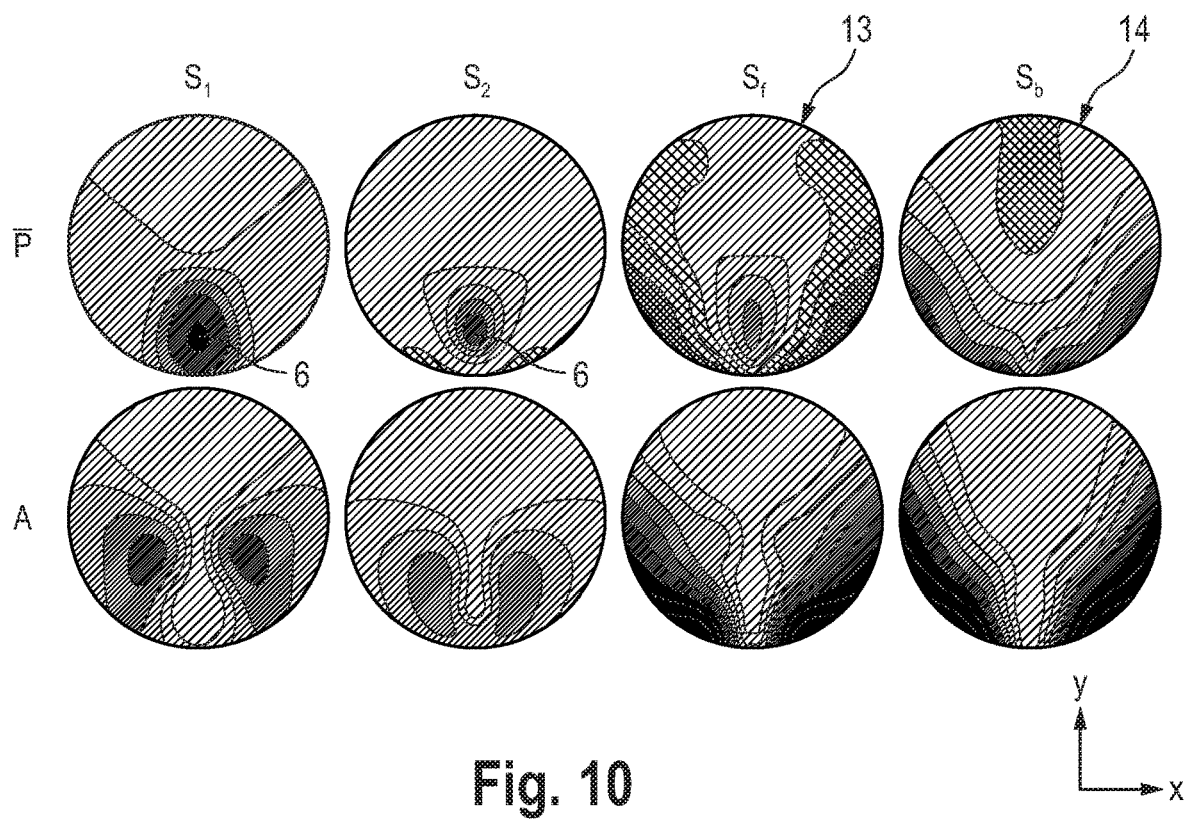
FIG. 10 shows schematic diagrams of mean back vertex power and astigmatic back vertex power of a further embodiment of a first and a second predetermined configuration of near, distance and intermediate portions and of a first lens element and a second lens element according to an aspect of the present disclosure.
Figure 11:
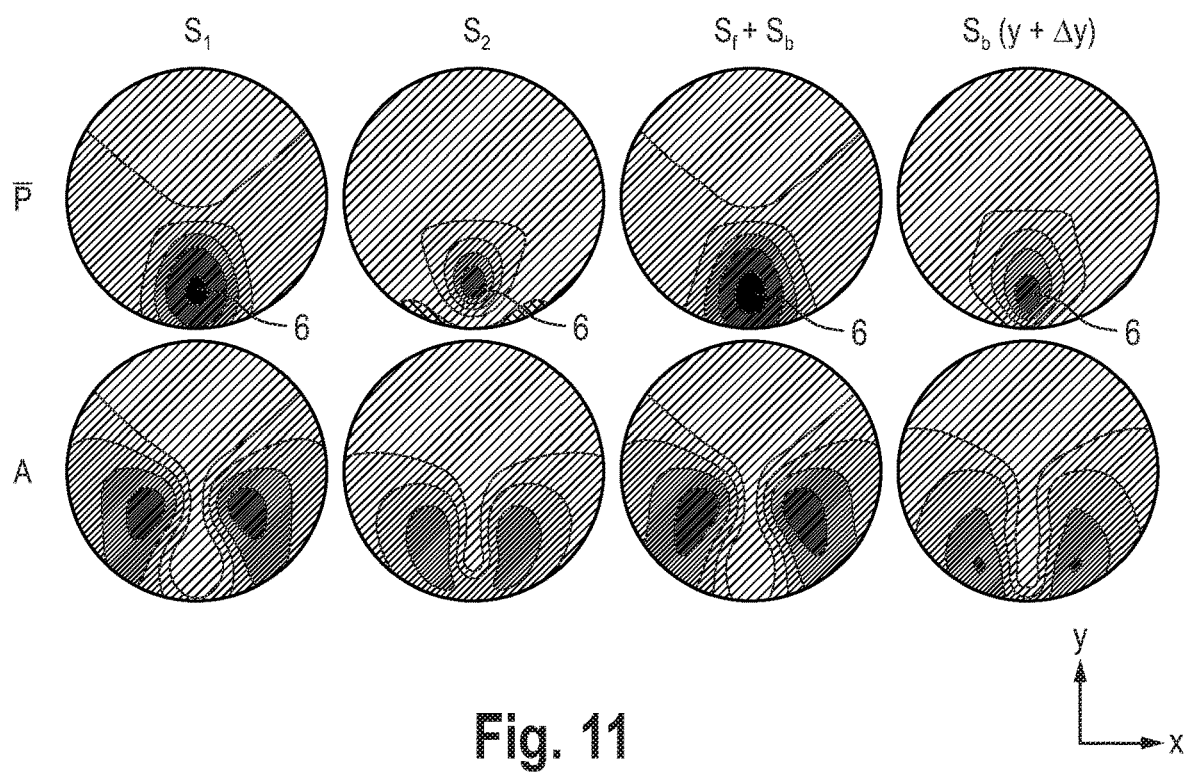
FIG. 11 shows schematic diagrams of mean back vertex power and astigmatic back vertex power of the embodiment of FIG. 10 and the combined optical properties of the first lens element and the second lens element of FIG. 10 in a first and a second position relative to each other; and, FIG. 12 shows a flow chart of an embodiment of a method for designing an adjustable progressive spectacle lens according to an aspect of the present disclosure.

FIG. 10 shows a further example of schematic diagrams of mean power and astigmatism of a further embodiment of a first and a second predetermined configuration S1 and S2 of near, distant and intermediate portions having different sizes of the near portion 6. The third column in FIG. 10 corresponds to a first lens element and the fourth column corresponds to a second lens element according to an aspect of the present disclosure. The combined optical properties of the first lens element and the second lens element in a first and a second position relative to each other are illustrated by the diagrams in the third and fourth column of FIG. 11, respectively.

The targets or desired predetermined configurations are both 2.50 D add surfaces but, in the present embodiment, with different sizes of the near portions 6. The first predetermined configuration of near, distance and intermediate portions having a larger near zone 6 is illustrated by the graphs in the first column of FIG. 10 and FIG. 11 and indicated by $S_1$. The second predetermined configuration of near, distance and intermediate portions having a smaller near portion 6 is illustrated by the graphs in the second column of FIG. 10 and FIG. 11 and indicated by $S_2$. For example the first configuration $S_1$ could be for standard wear while the second configuration $S_2$ having a smaller near zone and advantageously a wider distance zone could be used for playing tennis or some other outdoor activity or driving.

The first lens element 3 and the second lens element 4 can again be determined as described above with reference to FIG. 3 and FIG. 4. In the shown embodiment, the back surface of the first lens element 3 and the front surface of the second lens element 4 are again configured as spherical surfaces. The front surface 13 of the first lens element 3, as shown in the third column of FIG. 10, is denoted by $S_f$. The back surface 14 of the second lens element 4, as shown in the fourth column of FIG. 10, is denoted by $S_b$. The graphs in FIG. 11, column 3 show the combined optical properties providing the first predetermined configuration of near, distance and intermediate portions which correspond to the setting of $S_1$ in column 1. The graphs in FIG. 11, column 4 show the combined optical properties of the first and second lens elements in a second position relative to each other, wherein the second lens element is intentionally misaligned by a distance $\Delta y$. Therein, the combined optical properties correspond to the second predetermined configuration of near, distance and intermediate portions providing a smaller near portion 6 and a wider distance portion, which correspond to the setting of $S_2$ in column 2 of FIG. 10.

Figure 12:
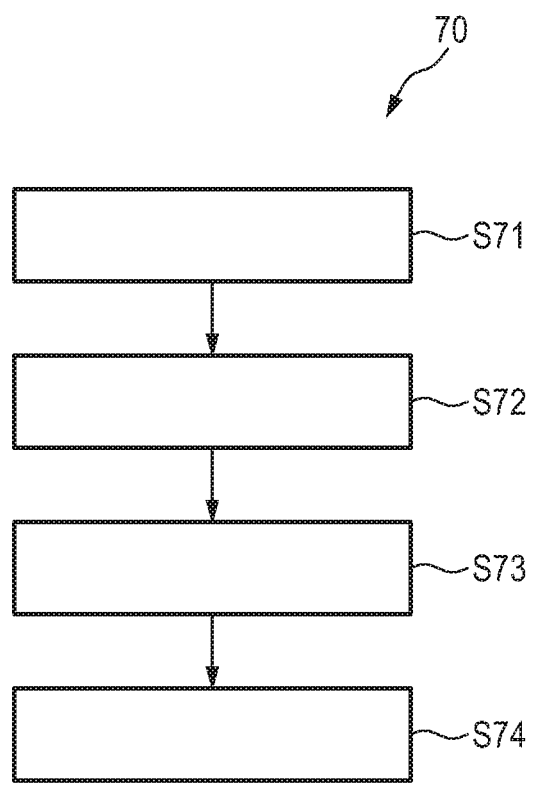

FIG. 12 shows an embodiment of a flow chart of a method for manufacturing an adjustable progressive spectacle lens, the adjustable progressive spectacle lens comprising a first lens element and a second lens element arranged one behind the other along the optical axis of the lens; wherein the first lens element and the second lens element are configured to work together to provide a near portion, a distance portion and an intermediate portion; and wherein the first lens element and the second lens element are configured to vary their combined optical properties when moved relative to each other in a direction transverse to the optical axis.

In a first step S71 data descriptive of a first predetermined configuration of at least one of near, distance and intermediate portions is obtained, i.e., received or retrieved. The corresponding data can thus be received, e.g. via a communication interface, or actively retrieved, e.g. from a database comprising data of the wearer. The data may explicitly describe a configuration of near, distance and intermediate portions as desired by the wearer or may also include implicit information such as visual tasks performed by the wearer that may indicate whether a large or small near and/or distance portion is required or could also refer e.g. to an employment of the wearer. For example, an office clerk may require a larger near portion whereas a professional driver may require a larger distance portion.

In a second step S72, data descriptive of a second predetermined configuration of at least one of near, distance and intermediate portions is obtained. The steps S71 and S72 may also be carried out in parallel or in reverse order.

In a third step S73 the first and second lens elements are determined such that the first lens element and the second lens element work together to provide, in a first position relative to each other, the near, distance and intermediate portions according to the first predetermined configuration; and to provide, in a second position relative to each other, the near, distance and intermediate portions according to the second predetermined configuration. In other words, the first and the second lens element are configured to provide combined optical properties corresponding to the first predetermined configuration in a first position relative to each other and configured to provide combined optical properties corresponding to the second predetermined configuration when arranged in the second position relative to each other.

In a further, optional step S74, the adjustable progressive spectacle lens can be manufactured according to the lens design of the adjustable progressive spectacle lens as determined in the preceding steps. The step S74 may be further subdivided into manufacturing the front and/or back surfaces of the first and second lens elements as determined in step S73, providing a movement device configured to move at least one of the lens elements relative to the other in a direction transverse to the optical axis of the lens, and mounting the first and second lens elements to the means.

It should be noted that there is a trade-off between how much variation in the surface shape, compared to a standard progressive lens, is required to accomplish the change in optics versus the amount of shifts, in particular vertical shifts required. The shorter the shift, the greater the gradient or corruption in the surface power. If the surface power changes by a very large amount, and is therefore significantly different between e.g. the front of the front lens and the back of the back lens, this can require significantly thicker lenses. However, moving the lens elements at large distances with respect to each other can make mechanics and aesthetics of the frame difficult.

In conclusion, an advantageous expansion of the Alvarez lens concept has been presented that allows a progressive spectacle lens to be adapted to individual vision scenarios. Since the adjustable progressive spectacle lens provides a near portion, a distance portion and an intermediate portion, it is no longer necessary to frequently readjust the position of the first lens element and the second lens element relative to each other each time the viewing distance changes. However, the adjustment enables the possibility to optimize the configuration of near, distance and intermediate portions to a current visual task such as desk work or driving without having to change spectacles.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

It is understood that the foregoing description is that of the preferred embodiments of the invention and that various changes and modifications may be made thereto without departing from the spirit and scope of the invention as defined in the appended claims.

What is claimed is:

1. An adjustable spectacle lens comprising:
   a first lens element and a second lens element arranged one behind the other along an optical axis of the adjustable spectacle lens; wherein the first lens element and the second lens element conjointly define combined optical properties;
   wherein said first lens element and said second lens element are the adjustable spectacle lens' only two lens elements;

wherein the first lens element and the second lens element are configured to vary the combined optical properties when moved relative to each other in a direction transverse to the optical axis;

wherein the adjustable spectacle lens is an adjustable progressive spectacle lens, wherein the first lens element and the second lens element are configured to conjointly provide a near portion, a distance portion and an intermediate portion;

wherein the first lens element and the second lens element are configured to conjointly and simultaneously provide, in a first position relative to each other, a first predetermined configuration of usable near, distance and intermediate portions;

wherein the first lens element and the second lens element are configured to conjointly and simultaneously provide, in a second position relative to each other, a second predetermined configuration of usable near, distance and intermediate portions; and, the first lens element and the second lens element being configured to vary at least one of:
(a) a size of the near portion, the distance portion, and the intermediate portion relative to each other, and
(b) a power of the near portion, the distance portion, and the intermediate portion relative to each other, when the first lens element and the second lens element are moved relative to each other in a direction transverse to the optical axis.

2. An adjustable spectacle lens comprising:
a first lens element and a second lens element arranged one behind the other along an optical axis of the adjustable spectacle lens; wherein the first lens element and the second lens element conjointly define combined optical properties;

wherein said first lens element and said second lens element are the adjustable spectacle lens' only two lens elements;

wherein the first lens element and the second lens element are configured to vary the combined optical properties when moved relative to each other in a direction transverse to the optical axis;

wherein the adjustable spectacle lens is an adjustable progressive spectacle lens, wherein the first lens element and the second lens element are configured to conjointly provide a near portion, a distance portion and an intermediate portion;

wherein the first lens element and the second lens element are configured to conjointly and simultaneously provide, in a first position relative to each other, a first predetermined configuration of usable near, distance and intermediate portions;

wherein the first lens element and the second lens element are configured to conjointly and simultaneously provide, in a second position relative to each other, a second predetermined configuration of usable near, distance and intermediate portions; and, the first lens element and the second lens element being configured to vary at least one of an add power of the near portion, a size of the near portion, a size of the distance portion, and a size of the intermediate portion, when the first lens element and the second lens element are moved relative to each other in a direction transverse to the optical axis.

3. The adjustable spectacle lens of claim 1, wherein the first lens element and the second lens element are movable between the first position and the second position relative to each other in a vertical direction in an as-worn orientation.

4. The adjustable spectacle lens of claim 1, wherein the first lens element and the second lens element are configured to vary an add power of the near portion when moved relative to each other in the direction transverse to the optical axis.

5. The adjustable spectacle lens of claim 1, wherein the first lens element and the second lens element are configured to vary at least one of a size of the near portion, a size of the distance portion and a size of the intermediate portion, when moved relative to each other in the direction transverse to the optical axis.

6. The adjustable spectacle lens of claim 1, wherein the first lens element has a back surface and the second lens element has a front surface; wherein the back surface of the first lens element faces the front surface of the second lens element; wherein the back surface of the first lens element corresponds to the front surface of the second lens element and wherein the back surface of the first lens element and the front surface of the second lens element are shaped such that they are movable with respect to each other.

7. The adjustable spectacle lens of claim 6, wherein the back surface of the first lens element and the front surface of the second lens element are corresponding spherical surfaces.

8. The adjustable spectacle lens of claim 1, wherein the first lens element and the second lens element are movable relative to each other between a first fixed position and a second fixed position.

9. The adjustable spectacle lens of claim 8, wherein the first fixed position is a main position and the second fixed position is an auxiliary position; and wherein the first lens element and the second lens element are configured to conjointly provide lower aberrations in the main position than in the auxiliary position.

10. The adjustable spectacle lens of claim 1, wherein the first lens element and the second lens element are configured to be moved relative to each other by a distance out of a group of distances: between 0.1 mm and 6 mm, between 0.2 mm and 4 mm, between 0.5 mm and 3 mm, and between 1 mm and 2 mm, in a direction transverse to the optical axis.

11. The adjustable spectacle lens of claim 1, further comprising means for moving at least one of the lens elements relative to the other in a direction transverse to the optical axis of the lens.

12. A computer implemented method for designing an adjustable progressive spectacle lens, the adjustable progressive spectacle lens including a first lens element and a second lens element arranged one behind the other along an optical axis of the adjustable progressive spectacle lens; wherein the first lens element and the second lens element are the adjustable spectacle lens' only two lens elements; wherein the first lens element and the second lens element are configured to conjointly provide a near portion, a distance portion and an intermediate portion; wherein the first lens element and the second lens element are configured to conjointly and simultaneously provide, in a first position relative to each other, a first predetermined configuration of usable near, distance and intermediate portions; wherein the first lens element and the second lens element are configured to conjointly and simultaneously provide, in a second position relative to each other, a second predetermined configuration of usable near, distance and intermediate portions; and wherein the first lens element and the second lens element are configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in a direction transverse to the optical axis; the method comprising the steps of:

obtaining data descriptive of the first predetermined configuration of at least one of the usable near, distance and intermediate portions;

obtaining data descriptive of the second predetermined configuration of at least one of the usable near, distance and intermediate portions;

determining the first and the second lens elements such that the first lens element and the second lens element conjointly and simultaneously provide, in a first position relative to each other, the usable near, distance and intermediate portions according to the first predetermined configuration; and to provide, in a second position relative to each other, the usable near, distance and intermediate portions according to the second predetermined configuration.

13. A computer implemented method for designing an adjustable progressive spectacle lens, the adjustable progressive spectacle lens including a first lens element and a second lens element arranged one behind the other along an optical axis of the adjustable progressive spectacle lens; wherein said first lens element and said second lens element are the adjustable spectacle lens' only two lens elements; wherein the first lens element and the second lens element are configured to conjointly provide a near portion, a distance portion and an intermediate portion; wherein the first lens element and the second lens element are configured to conjointly and simultaneously provide, in a first position relative to each other, a first predetermined configuration of usable near, distance and intermediate portions; wherein the first lens element and the second lens element are configured to conjointly and simultaneously provide, in a second position relative to each other, a second predetermined configuration of usable near, distance and intermediate portions; and wherein the first lens element and the second lens element are configured to vary at least one of an add power of the near portion, a size of the near portion, a size of the distance portion, and a size of the intermediate portion, when the first lens element and the second lens element are moved relative to each other in a direction transverse to the optical axis; the method comprising the steps of:

obtaining data descriptive of the first predetermined configuration of at least one of the usable near, distance and intermediate portions;

obtaining data descriptive of the second predetermined configuration of at least one of the usable near, distance and intermediate portions;

determining the first and the second lens elements such that the first lens element and the second lens element conjointly and simultaneously provide, in a first position relative to each other, the usable near, distance and intermediate portions according to the first predetermined configuration; and to provide, in a second position relative to each other, the usable near, distance and intermediate portions according to the second predetermined configuration.

14. A method for manufacturing an adjustable progressive spectacle lens, the adjustable progressive spectacle lens including a first lens element and a second lens element arranged one behind the other along an optical axis of the adjustable progressive spectacle lens; wherein said first lens element and said second lens element are the adjustable spectacle lens' only two lens elements; wherein the first lens element and the second lens element are configured to conjointly provide a near portion, a distance portion and an intermediate portion; wherein the first lens element and the second lens element are configured to conjointly and simultaneously provide, in a first position relative to each other, a first predetermined configuration of usable near, distance and intermediate portions; wherein the first lens element and the second lens element are configured to conjointly and simultaneously provide, in a second position relative to each other, a second predetermined configuration of usable near, distance and intermediate portions; and wherein the first lens element and the second lens element are configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in a direction transverse to the optical axis; the method comprising the steps of:

obtaining data descriptive of the first predetermined configuration of at least one of the usable near, distance and intermediate portions;

obtaining data descriptive of the second predetermined configuration of at least one of the usable near, distance and intermediate portions;

determining the first and the second lens elements such that the first lens element and the second lens element conjointly and simultaneously provide, in a first position relative to each other, the usable near, distance and intermediate portions according to the first predetermined configuration; and to provide, in a second position relative to each other, the usable near, distance and intermediate portions according to the second predetermined configuration; and manufacturing the adjustable progressive spectacle lens according to the determination.

15. A method for manufacturing an adjustable progressive spectacle lens, the adjustable progressive spectacle lens including a first lens element and a second lens element arranged one behind the other along an optical axis of the adjustable progressive spectacle lens; wherein said first lens element and said second lens element are the adjustable spectacle lens' only two lens elements; wherein the first lens element and the second lens element are configured to conjointly provide a near portion, a distance portion and an intermediate portion; wherein the first lens element and the second lens element are configured to conjointly and simultaneously provide, in a first position relative to each other, a first predetermined configuration of usable near, distance and intermediate portions; wherein the first lens element and the second lens element are configured to conjointly and simultaneously provide, in a second position relative to each other, a second predetermined configuration of usable near, distance and intermediate portions; and wherein the first lens element and the second lens element are configured to vary at least one of an add power of the near portion, a size of the near portion, a size of the distance portion, and a size of the intermediate portion, when the first lens element and the second lens element are moved relative to each other in a direction transverse to the optical axis; the method comprising the steps of:

obtaining data descriptive of the first predetermined configuration of at least one of the usable near, distance and intermediate portions;

obtaining data descriptive of the second predetermined configuration of at least one of the usable near, distance and intermediate portions;

determining the first and the second lens elements such that the first lens element and the second lens element conjointly and simultaneously to provide, in a first position relative to each other, the usable near, distance and intermediate portions according to the first predetermined configuration; and to provide, in a second position relative to each other, the usable near, distance and intermediate portions according to the second predetermined configuration; and manufacturing the adjustable progressive spectacle lens according to the determination.

16. A computer program for designing an adjustable progressive spectacle lens, the adjustable progressive spectacle lens including a first lens element and a second lens element arranged one behind the other along an optical axis of the adjustable progressive spectacle lens; wherein said first lens element and said second lens element are the adjustable spectacle lens' only two lens elements; wherein the first lens element and the second lens element are configured to conjointly provide a near portion, a distance portion and an intermediate portion; wherein the first lens element and the second lens element are configured to conjointly and simultaneously provide, in a first position relative to each other, a first predetermined configuration of usable near, distance and intermediate portions; wherein the first lens element and the second lens element are configured to conjointly and simultaneously provide, in a second position relative to each other, a second predetermined configuration of near, distance and intermediate portions; and wherein the first lens element and the second lens element are configured to vary at least one of (a) a size of the near portion, the distance portion, and the intermediate portion relative to each other and (b) a power of the near portion, the distance portion, and the intermediate portion relative to each other, when the first lens element and the second lens element are moved relative to each other in a direction transverse to the optical axis; the computer program comprising:

a program code stored on a non-transitory computer readable medium, the program code being configured, when executed by a processor, to cause a computer to:

obtain data descriptive of the first predetermined configuration of at least one of the usable near, distance and intermediate portions;

obtain data descriptive of the second predetermined configuration of at least one of the usable near, distance and intermediate portions;

determine the first and the second lens elements such that the first lens element and the second lens element conjointly and simultaneously provide, in a first position relative to each other, the usable near, distance and intermediate portions according to the first predetermined configuration; and conjointly and simultaneously provide, in a second position relative to each other, the usable near, distance and intermediate portions according to the second predetermined configuration.

17. A computer program for designing an adjustable progressive spectacle lens, the adjustable progressive spectacle lens including a first lens element and a second lens element arranged one behind the other along an optical axis of the adjustable progressive spectacle lens; wherein said first lens element and said second lens element are the adjustable spectacle lens' only two lens elements; wherein the first lens element and the second lens element are configured to conjointly provide a near portion, a distance portion and an intermediate portion; wherein the first lens element and the second lens element are configured to conjointly and simultaneously provide, in a first position relative to each other, a first predetermined configuration of usable near, distance and intermediate portions; wherein the first lens element and the second lens element are configured to conjointly and simultaneously provide, in a second position relative to each other, a second predetermined configuration of usable near, distance and intermediate portions; and wherein the first lens element and the second lens element are configured to vary at least one of an add power of the near portion, a size of the near portion, a size of the distance portion, and a size of the intermediate portion, when the first lens element and the second lens element are moved relative to each other in a direction transverse to the optical axis; the computer program comprising:

a program code stored on a non-transitory computer readable medium, the program code being configured, when executed by a processor, to cause a computer to:

obtain data descriptive of the first predetermined configuration of at least one of the usable near, distance and intermediate portions;

obtain data descriptive of the second predetermined configuration of at least one of the usable near, distance and intermediate portions;

determine the first and the second lens elements such that the first lens element and the second lens element conjointly and simultaneously provide, in a first position relative to each other, the usable near, distance and intermediate portions according to the first predetermined configuration; and conjointly and simultaneously provide, in a second position relative to each other, the usable near, distance and intermediate portions according to the second predetermined configuration.

18. The adjustable spectacle lens of claim 1, wherein the adjustable spectacle lens is configured to provide an increasing addition power as a wearer of the adjustable spectacle lens looks down.

* * * * *

UNITED STATES PATENT AND TRADEMARK OFFICE
CERTIFICATE OF CORRECTION

PATENT NO. : 11,086,144 B2
APPLICATION NO. : 16/657702
DATED : August 10, 2021
INVENTOR(S) : R. Spratt et al.

Page 1 of 1

It is certified that error appears in the above-identified patent and that said Letters Patent is hereby corrected as shown below:

In the Specification

In Column 12:
Line 65: delete "P" and insert -- $\overline{P}$ -- therefor.

Signed and Sealed this
Third Day of May, 2022

Katherine Kelly Vidal
*Director of the United States Patent and Trademark Office*